United States Patent [19]

Handa et al.

[11] 3,920,644

[45] Nov. 18, 1975

[54] PROCESS FOR PREPARING HALOGEN-CONTAINING ORGANIC ISOCYANATES

[75] Inventors: Susumu Handa, Wakayama; Yoshiaki Tanaka, Osaka; Atsushi Nishibata; Yoshiaki Inamoto, both of Wakayama, all of Japan

[73] Assignee: Kao Soap Co., Ltd., Tokyo, Japan

[22] Filed: July 12, 1974

[21] Appl. No.: 487,899

[30] Foreign Application Priority Data

July 17, 1973  Japan.............................. 48-81533

[52] U.S. Cl. ............... 260/248 NS; 260/2.5 AT; 260/2.5 AW; 260/453 P
[51] Int. Cl.$^2$............. C07C 118/00; C07D 251/04
[58] Field of Search ................. 260/453 P, 348 NS

[56] References Cited
UNITED STATES PATENTS

| | | | |
|---|---|---|---|
| 2,866,801 | 12/1958 | Himel et al. ....................... | 260/453 |
| 2,866,802 | 12/1958 | Graham ............................. | 260/453 |
| 2,866,803 | 12/1958 | DePree ............................. | 260/453 |
| 3,017,420 | 1/1962 | Schaeffer .......................... | 260/453 |

*Primary Examiner*—Lewis Gotts
*Assistant Examiner*—Dolph H. Torrence
*Attorney, Agent, or Firm*—Woodhams, Blanchard and Flynn

[57] ABSTRACT

A process for preparing halogen-containing organic isocyanates, in which a benzene derivative having a chloromethyl group and an additional benzene-nucleus substituent having a steric interaction with the chloromethyl group and also having a halogen content of at least 80 percent by weight, said substituent being located ortho to the chloromethyl group, and an alkali metal cyanate, are heated at 60° to 190°C, in the presence of an amine compound that does not cause substitution with the chlorine atom of said chloromethyl group.

8 Claims, No Drawings

PROCESS FOR PREPARING HALOGEN-CONTAINING ORGANIC ISOCYANATES

BACKGROUND OF THE INVENTION

1. Field of the Invention

This invention relates to a process for preparing halogen-containing organic isocyanates.

It is a primary object of this invention to provide a process, as aforesaid, in which a halogen-containing organic isocyanate can be prepared in large quantities with economical advantages without using a starting compound which is poisonous and difficult to handle.

2. DESCRIPTION OF THE PRIOR ART

Halogen-containing organic isocyanates are known valuable compounds useful as starting materials for preparing synthetic resins such as polyurethanes, polyurea resins, polyisocyanate resins and the like, especially as materials for imparting improved flame resistance and heat resistance to these synthetic resins, and as starting materials for preparing organic synthetic chemicals, agricultural chemicals and other industrial chemicals. The products of the process of the present invention are useful for these same purposes. Recently, the demand for such halogen-containing organic isocyanates has been increasing and the development of a process for the large scale industrial production of these organic isocyanates has been greatly desired in the art.

In the conventional processes for the preparation of these organic isocyanates, it is necessary to use as a starting material a compound which is poisonous and difficult to handle, such as phosgenes and alkali azides or very expensive compounds, such as amines and acid chlorides. Therefore, these conventional processes have practical disadvantages, particularly if the desired products are to be prepared in large quantities economically.

SUMMARY OF THE INVENTION

We have discovered a process which completely overcomes all of the defects of the conventional processes for preparing halogenated organic isocyanates. More specifically, we have discovered a process in which (A) a benzene derivative having a chloromethyl group substituted on the benzene nucleau and having an additional substituent on the benzene nucleus, which additional substituent has a steric interaction with the chloromethyl group and also has a halogen content of at least 80% by weight, said additional substituent being located ortho to the chloromethyl group, and (B) an alkali cyanate, are heated and reacted at 60° to 190°C., in the presence of (C) an amine compound having such a structure that it does not cause substitution with the chlorine atom of said chloromethyl group, and there is obtained a halogen-containing organic isocyanate as a reaction product. The process of this invention can be carried out very easily and the process is very excellent and advantageous from the industrial viewpoint.

As the benzene derivative (A) having a benzene-nucleus substituted chloromethyl group ($-CH_2Cl$) and also having at least one additional benzene-nucleus substituent located ortho to the chloromethyl group, said additional substituent having a steric interaction with the chloromethyl group and having a halogen content of at least 80 percent by weight, which is used as a starting substance in this invention, there can be enumerated, for example, ortho-chlorobenzyl chloride, ortho-bromobenzyl chloride, 2,6-dichlorobenzyl chloride, 2,6-dibromobenzyl chloride, 2-chloro-6-bromobenzyl chloride, ortho-(trifluoromethyl)benzyl chloride, 2,6-bis(trifluoromethyl)benzyl chloride, 2-fluoro-6-trifluoromethylbenzyl chloride, 2-fluoro-6-polyfluoroalkylbenzyl chlorides, 2-chloror-6-trifluoromethylbenzyl chloride, 2,6-bis(chloromethyl)benzotrifluoride, 2-difluoromonochloromethylbenzyl chloride, 2monofluorodichloromethylbenzyl chloride, 2-chloromethylbenzal chloride, 2-chloromethylbenzotrichloride, 2-chloromethylstyrene dibromide, 2,3-bis(chloromethyl)chlorobenzene, 2,3-bis(chloromethyl)bromobenzene, 2-chloromethyl-3,6-dichlorobenzyl chloride, 2,6-bis(chloromethyl)chlorobenzene, 3-chloromethyl-2-chlorobenzyl chloride, 3-chloromethyl-6-chlorobenzyl chloride, 3-chloromethyl-4,6-dichlorobenzyl chloride, 3-chloromethyl-2,4,6-trichlorobenzyl chloride, 4-chloromethyl-2-chlorobenzyl chloride, 2,3-dichloro-4-chloromethylbenzyl chloride, 2,5-dichloro-4-chloromethylbenzyl chloride, 3,5-dichloro-4-chloromethylbenzyl chloride, pentachlorobenzyl chloride, bis(chloromethyl)tetrachlorobenzene, chloromethylated chlorobiphenyl, chloromethylated polychlorobiphenyl, 2,4-bis(chloromethyl)bromobenzene, 2,4-bis(chloromethyl)chlorobenzene, 2,5-bis(chloromethyl)bromobenzene and the like. These benzene derivatives can be used singly or in the form of mixtures of two or more of them. It is possible to use a mixture of chloromethylbenzene derivatives containing at least 70 percent of one or more of the above-exemplified compounds. As indicated above, in addition to the chloromethyl substituent and the additional substituent ortho to chloromethyl, the benzene derivative can contain additional nucleus substituents. It is preferred that all substituents on the benzene nucleus are selected from the group consisting of halogen and methyl mono-, di- and trihalides. As the halogen, it is preferred to use chloro, bromo or fluoro. However, the substituent located ortho to the chloromethyl cannot be fluoro alone.

The "alkali cyanate" is an alkali metal salt of cyanic acid selected from the group consisting of lithium cyanate, sodium cyanate, potassium cyanate and mixtures thereof. Either the reagent grade or the industrial grade of the alkali cyanate can be used in this invention. Commercially available alkali cyanates sometimes contain such impurities as alkali carbonates, alkali cyanurates, urea and cyamelide. No particular disadvantages are brought about by employing such commercially available products in this invention, provided that the purity of the alkali cyanate is at least 60 percent by weight.

The term "amine compound having a structure such that it does not cause substitution with the chloride atom of the chloromethyl group of the benzene derivative" refers to secondary amines which can scarcely replace the chlorine atom of the chloromethyl group because of the steric hindrance, tertiary amines which form, together with the chloromethyl group, an ammonium salt which can readily be decomposed without heating, acylated products of secondary amines which form weak onium salts with the chloromethyl group, quaternary ammonium salts which have a weak interaction with the chloromethyl group, and the like. As typical examples of such amine compounds, there can be enumerated diphenylamine, N-cyclohexylaniline, triphenylamine, trimethylamine, triethylamine, tripropylamine, tributylamine, dimethylaniline, diethylaniline, pyridine, picoline, corydine, quinoline, N-methylmorpholine, N-ethyl-morpholine, N-phenylmorpholine, triethylene diamine, N-methylpiperidine, N-ethylpiperidine, N-phenylpiperidine, N,N'-dimethylpiperazine, N,N'-diethylpiperazine, dimethyl formamide, diethyl formamide, dimethyl acetamide, tetramethylurea, N-methylpyrrolidone, formylmorpholine, acetylmorpholine, formylpiperidine, acetylpiperidine, N-methyl phthalimide, and quaternary ammonium salts formed from the foregoing amines. These amine compounds can be used singly or in the form of mixtures of two or more of them. It is possible to employ mixed solvents consisting essentially of the foregoing amine compounds.

In this invention, because the above-mentioned benzene derivative having a chloromethyl group and an additional substituent nucleus substituted at the ortho-position to the chloromethyl group, said additional substituent having a steric interaction with the chloromethyl group and a halogen content of at least 80 percent by weight, is employed as the starting substance, in the reaction between the benzene derivative and the alkali cyanate, the formation of an isocyanic acid ester proceeds predominantly and the formation of an isocyanuric acid ester is inhibited or retarded. Based on this novel discovery, we have arrived at the process of this invention.

The invention will now be further illustrated by reference to a typical representative reaction scheme. In the following chart, ortho-chlorobenzyl chloride is referred to as a typical example of the starting benzene derivative and sodium cyanate is referred to as a typical example of the alkali cyanate.

There can occur reactions such as represented by the following equations (1) and (2):

These reactions (1) and (2) generally proceed successively and in parallel, if a simple alkyl halide is used as the starting substance. More specifically, the reaction (1) is a nucleophilic substitution reaction and the reaction (2) is a trimerization reaction, and formally, it is considered that the reaction (1) occurs first and then the reaction (2) is allowed to proceed. In practice, however, in the reaction system wherein a number of molecules of the isocyanate ester is present, namely after considerable advance of the reaction (1), especially when a specific solvent such as an amine compound, a sulfoxide compound, a phosphoric acid amide and a nitrile compound is also present, the reaction (2) advances beginning a little later than the reaction (1), and thereafter it proceeds practically substantially coincidentally with the further progress of reaction (1). Accordingly, it is impossible to cause the reactions (1) and (2) to occur separately and to isolate the product of the reaction (1) alone, unless an alkyl halide of a specific structure is used and particular specific reaction conditions are chosen or an acidic substance is made to be present in the reaction system. This tendency is even more conspicuous in the case of chloromethylbenzenes, which are included in the general class of aralkyl halide compounds, than it is in the case of alkyl halides. In the case of chloromethyl benzenes, it is difficult, and substantially impossible in some cases, to obtain isocyanic acid esters according to the conventional techniques.

We have discovered as a result of experiments on various benzene derivatives containing a chloromethyl group, that the use of chloromethyl group-containing benzene derivatives having a substituent with a halogen content of at least 80 percent by weight at the ortho-position to the chloromethyl group is indispensable in order to synthesize organic isocyanates by reaction (1) from such benzene derivatives. Based on this discovery, we have obtained a process for the preparation of organic isocyanates on an industrial basis.

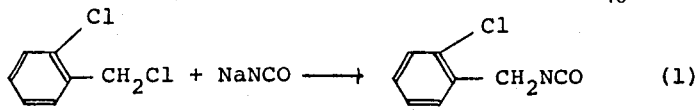

(1)

and

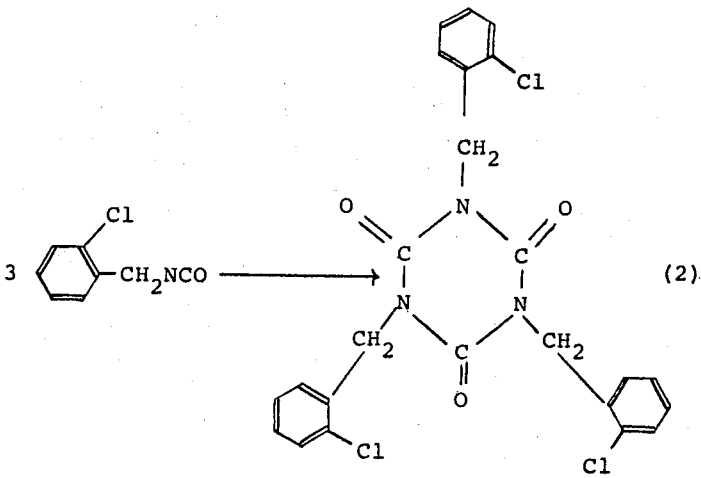

(2)

In the process of this invention it is desired that the reaction of equation (1) will be predominant and that the reaction of equation (2) will be minimized.

As regards the steric interaction between the substituents of di-substituted benzene compounds, it is pointed out that the steric interaction is observed mainly between the substituents located at the ortho-positions to each other. This is confirmed by the fact that in the case of, for example, dihalogenbenzenes, the calculated value of the dipole efficiency is different from the measured value thereof. Such analysis is only a physicochemical observation of the static state, and according to such analysis it is difficult to determine the limit of a reaction which relates to the dynamic state. However, we have found that it is possible to limit the reaction in connection with the process of this invention substantially to reaction (1), provided that the halogen content (% by weight) of the substituent at the ortho-position to the chloromethyl group has a critical lower limit. More specifically, we have discovered that in practicing the process of this invention, it is critical to use a starting chloromethyl benzene derivative in which an additional substituent having a halogen content of at least 80 percent by weight, perferably at least 85 percent by weight, is located at the ortho-position to the chloromethyl group. When the chloromethyl group undergoes the substitution reaction according to the reaction (1), provided that an additional substituent having a halogen content of at least 80 percent by weight is located at the orthoposition to the chloromethyl group, an increase or decrease of the reaction rate considered to be due to the so-called ortho effect is brought about. This increase or decrease is influenced by the halogen content and the halogen structure of the substituent present at the ortho-position. When the halogen content of the substituent ortho to chloromethyl is lower than 80 percent by weight of the calculated molecular weight of the substituent, the yield of the desired organic isocyanate is drastically lowered. For example, when there are employed substituents considered to have a steric interaction and to exert an ortho effect to the chloromethyl group, such as fluoro, methyl, ethyl, methoxy, ethoxy, hydroxyl and difluoromethyl, it is impossible to obtain the desired organic isocyanate in a good yield. In such case, the yield of the cyanuric acid ester as the by-product increases and the formation of a tar-like by-product increases, with the result that the objects of this invention cannot be attained.

The reaction temperature applicable to the process of this invention is within the range of 60° to 190°C., preferably 70° to 160°C.

It has been found that the presence of a member of a class of specific organic amine compounds is indispensable for performing the desired reaction of this invention. This specific amine compound is not a specific solvent such as those mentioned above, but rather it is an amine compound having a structure such that it does not undergo substitution with the chlorine atom of the chloromethyl group. This amine compound performs multiple functions as a solvent, a catalyst and a phase transfer agent, and it exhibits effects exceeding the effects attained by use of a substance which acts merely as a solvent.

The advantages of this invention will be more apparent from a further description of another specific example illustrated below. This example relates to the reaction in which 2,5-bis(chloromethyl)chlorobenzene is used as the starting benzene derivative and sodium cyanate is used as the alkali cyanate. This example is represented by the following reaction equations:

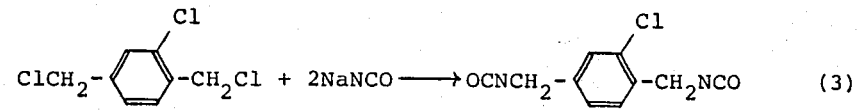

and

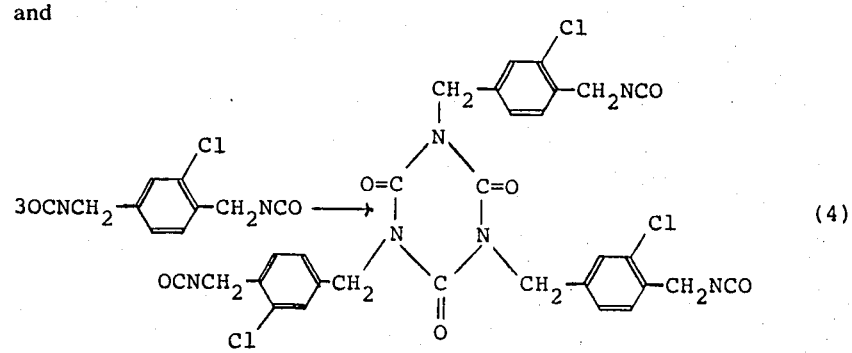

We have found that 2,5-bis(isocyanatomethyl)-chlorobenzene formed by the equation (3) is trimerized mainly at the isocyanate group portions, other than the isocyanate group present at the ortho-position to the chlorine atom, as shown in the equation (4), to form an isocyanate ring, but the isocyanate group bonded to the methylene group present at the ortho-position to the chlorine atom is left unreacted up to termination of the reaction. There is a great tendency to form a halogen-containing triisocyanate as shown in the equation (4). It has also been found that in this case the reaction of the equation (4) is much slower as compared with the case in which there is employed a bis(-chloromethyl)benzene in which there is no ortho-chlorine atom present on the benzene nucleus.

The ratio of the amounts of the reactants to be used in this invention will now be described. It is critical that the alkali cyanate is used in an amount of from 0.5 to 2.5 moles per mole of chlorine atom of the chloromethyl groups of the above-mentioned benzene derivative to be used in this invention. If the amount of the alkali cyanate is smaller than the above range, a part of the chloromethyl group-containing benzene derivative is left in the unreacted state in the resulting reaction mixture, and if the amount of the alkail cyanate is increased, the amount formed of the isocyanuric acid ester increases. Therefore, the ratio of the amounts used of (A) the benzene derivative and (B) the alkali cyanate should be adjusted appropriately depending on the desired product.

If the foregoing requirements are satisfied, the process of this invention can be practiced easily, with safety and without employing any special reaction apparatus. The amount of the amine compound added to the starting reactants can be either a solvent amount, i.e. sufficient to dissolve the benzene derivative and the alkali cyanate, or at least a catalytic amount, i.e. at least 1 mole per mole of chlorine atom of the chloromethyl groups of the benzene derivative. Addition and mixing of the starting substances and recovery of the isocyanic acid ester from the reaction mixture are performed taking into consideration the ease of separation of the desired ester from the amine compound, the separation of the inorganic salt and other factors. Accordingly, the recovery operation and separation order should be chosen appropriately depending on the kinds of the starting substances and the properties of the product, for example, depending on whether the reaction product is solid or liquid.

Reaction equations (1) to (4) are rather simplified for the purpose of illustrating the steric interaction between the substituents ortho-positioned to each other. The actual reactions are more complicated than those shown by these equations. For example, in the reaction represented by the equation (4), it is known that the isocyanatomethyl group at the orthoposition to the chlorine atom undergoes trimerization to some extent. However, if bis(chloromethyl)benzene or poly(chloromethyl)benzene is used as the starting benzene derivative, contrary to the teachings of this invention, as is well known in the art the entire system is gellated and a so-called polyisocyanurate or a high-molecular-weight isocyanurate-containing polyisocyanate is formed. In the process of this invention, formation of such polyesters of isocyanuric acid is inhibited as much as possible, and even if a bis(chloromethyl)benzene derivative is employed as the starting substance, only one isocyanurate ring is mainly formed while inhibiting the reaction of forming macromolecular compounds as much as possible, whereby halogen-containing organic isocyanates are effectively obtained, which are valuable as starting materials for the synthesis of synthetic resins, organic synthetic chemicals, agricultural chemicals and other industrial products.

This invention will now be further described by reference to the following illustrative Examples.

Example 1

Reactions for the formation of halogen-containing organic isocyanates from (A) ortho-chlorobenzyl chloride, 2,4-bis-(chloromethyl)chlorobenzene and 2,5-bis(chloromethyl)chlorobenzene, and (B) sodium cyanate were examined. Purified sodium cyanate (0.2g) (100% purity as NaNCO) was saturated in 750 ml of purified dimethyl formamide, and 0.4 – 0.5 g of the benzene derivative mentioned above was precisely weighed and added to the saturated solution. The mixture was maintained at 80°C. for 4 hours and then it was examined to determine the extent to which the chloromethyl group was converted to the isocyanatomethyl group during this period.

In the case of ortho-chlorobenzyl chloride, it was found that more than about 70 percent of the starting benzene derivative was converted to ortho-chlorobenzyl isocyanate and the conversion rate was 2—3 times higher than in the case of benzyl chloride. In the case of both 2,4-bis(chloromethyl)chlorobenzene and 2,5-bis(chloromethyl)chlorobenzene, it was found that a corresponding compound in which the chloromethyl group is converted to the isocyanatomethyl group was obtained in a better yield than in the case of benzyl chloride. In this reaction, although the yield of the isocyanate increased if the reaction time was prolonged, if no chlorine atom was present at the ortho-position to the isocyanatomethyl group, for example, in the case of benzyl chloride, the reaction product was composed substantially of a tribenzyl isocyanaurate and no isocyanate could be recovered.

Example 2

A mixture composed of 40 g of N,N-dimethylaniline, 230 g of tetramethylurea, 100 g of potassium cyanate (98% purity as KNCO), 2 g of calcium chloride and 16 g of ortho-chlorobenzyl chloride was reacted under agitation at 97°–99°C. for 2 hours. Then, the reaction mixture was cooled rapidly and the precipitated inorganic salt was separated by filtration. The filtrate was subjected to distillation under reduced pressure to collect a fraction boiling at 65°–68°C. under 0.5 mmHg. Thus there was obtained 137 g of ortho-chlorobenzyl isocyanate.

Example 3

A mixture composed of 2 g of pyridine, 72 g of N-methylpyrrolidone, 10 g of sodium cyanate (90% purity as NaNCO), 2 g of barium chloride and 19.7 g of ortho-(trifluoromethyl)benzyl chloride was reacted under agitation at 100°C. for 2 hours. Then, the reaction mixture was cooled and the inorganic salt was separated by filtration. The filtrate was subjected to distillation to obtain 7.3 g of ortho-(trifluoromethyl)benzyl isocyanate in the form of a fraction boiling at 85°–90°C. under 20 mmHg.

Example 4

A mixture composed of 100 g of diethyl formamide, 10 g of N-methylpiperidine methyl bromide, 10 g of sodium cyanate (98% purity as NaNCO) and 25 g of 2,6-bis(trifluoromethyl)benzyl chloride was reacted under agitation at 130°C. for 1 hour. Then, the reaction mixture was cooled and filtered. The filtrate was subjected to distillation under reduced pressure and a fraction boiling at 100°–110°C. under 15 mmHg was collected. Thus there was obtained 18 g of 2,6-bis(trifluoromethyl)benzyl isocyanate.

Example 5

A mixture composed of 10 g of 2,5-bis(chloromethyl)benzyl trifluoride, 20 g of potassium cyanate (98% purity as KNCO), 5 g of diphenylamine and 50 g of acetylpiperidine was reacted under agitation at 120°C. for 2 hours. Then, the reaction mixture was cooled and 100 ml of benzene was added to the reaction mixture. The resulting mixture was filtered and the filtrate was subjected to distillation to obtain 8 g of 2,5-bis-(isocyanatomethyl)benzotrifluoride in the form of a fraction melting at 100°–110°C. under 2 mmHg.

Example 6

A mixture composed of 15 g of 3-chloromethyl-4,6-dichlorobenzyl chloride, 40 g of sodium cyanate (88% purity as NaNCO) and 200 mg of dimethyl formamide was agitated at 100°C. for 2 hours and at 140°C. for 1 hour. The reaction mixture was cooled and 200 g of o-dichlorobenzene was added thereto. Dimethyl formamide was distilled off under reduced pressure at a temperature lower than 70°C. The residue was diluted with diethyl ether and filtered, and diethyl ether and o-dichlorobenzene were distilled from the filtrate to obtain 14 g of a brown viscous oily product. When this oily product was cooled with ice, it was converted to a semi-solid substance. As a result of the isocyanate group analysis, it was found that the product was a substance composed mainly of 1,3-bis(isocyanatomethyl)-4,6-dichlorobenzene (the purity being about 80%).

Example 7

A mixture composed of 700 ml of N-formylmorpholine, 130 g of sodium cyanate (96% purity as NaNCO) and 210 g of 2,4-bis(chloromethyl)chlorobenzene was reacted under agitation at 110°–120°C. for 5 hours. Then, the reaction mixture was cooled and 500 ml of benzene was added thereto. The resulting mixture was allowed to stand still overnight and then was filtered. N-formylmorpholine and benzene were distilled from the filtrate to obtain 190 of a brown pasty product as the residue. It was found that this product was composed mainly of tris(3-isocyanatomethyl-4-chlorobenzyl)isocyanurate and was very valuable as a starting isocyanate for the formation of polyurethanes.

In the same manner as described above, the reaction was repeated by employing 1,4-bis(chlormethyl)-chlorobenzene as the starting benzene derivative. As a reaction product, there was obtained 190 g of a brown semi-solid substance composed mainly of tris(2-chloro-4-isocyanatomethylbenzyl)isocyanurate.

Reference Example 1

A one-shot rigid polyisocyanurate-polyurethane foam was prepared from the polyisocyanate synthesised in Example VII according to the following formulation:

|  | Parts by weight |
|---|---|
| Polyether*¹ | 45 |
| Silicone surfactant*² | 2.0 |
| TMHD*³ | 2.0 |
| Polyisocyanate*⁴ | 100 |
| Freon-II | 25 |

*¹A polyoxypropylene triol having a hydroxy number of 520
*²Dow Corning Co., DC-193
*³Tetramethylhexamethylenediamine
*⁴From Example VII, NCO content of 17.5%

The polyisocyanate and Freon-11 were mixed in a closed container, and then the polyether, silicone surfactant and TMHD were added to the container, and stirred.

A foam had cream-time 40 seconds, rise-time 150 seconds. This rigid foam, density 30g/l, had exellent micro cells, and Bureau of Mines(U.S.A.) flame penetration time was more than an hour.

A foam was prepared from a polyisocyanate having no ortho substituent, synthesised from Xylylenedichlorides in a similar way as in Example VII, which was a semi-solid having a NCO content of 17.5%, and had a less solubility to Freon-11.

A rigid foam prepared by said formulation and procedure using this polyisocyanate had rough cells and high flyability. The flame penetration time of the foam was shorter than half of that of the foam containing ortho-chlorine. In addition to this the foam ortho-chlorine-free polyisocyanate had higher flammability than that from chlorine-containing polyisocyanate.

The embodiments of this invention in which an exclusive property or privilege is claimed are defined as follows:

1. A process for preparing halogen-containing organic isocyanates, which comprises: reacting at 60° to 190°C, A. a benzyl chloride derivative or a mixture of benzyl chloride derivatives having a nucleus-substituted substituent located ortho to the chloromethyl group, said substituent having a steric interaction with the chloromethyl group and having a halogen content of at least 80 percent by weight, provided that said substituent is not a fluorine atom, the remaining carbon atoms of the nucleus being unsubstituted or substituted by halogen, methylmonohalides, methyldihalides, methyltrihalides, vinyldibromide, or phenyl, B. an alkali metal cyanate selected from the group consisting of lithium cyanate, sodium cyanate, potassium cyanate and mixtures thereof, the amount of B being in the range of from 0.5 to 2.5 moles per mole of chlorine atom of the chloromethyl group or groups of A, in the presence of C. at least a catalytically effective amount of an amine compound or mixture of amine compounds having a structure such that it does not cause substitution with the chlorine atom of the chloromethyl group or groups of A, said amine compound being selected from the group consisting of diphenylamine, N-cyclohexylaniline, triphenylamine, trimethylamine, triethylamine, tripropylamine, tributylamine, dimethylaniline, diethylaniline, pyridine, picoline, corydine, quinoline, N-methylmorpholine, N-ethylmorpholine, N-phenylmorpholine, triethylene diamine, N-methylpiperidine, N-ethylpiperidine, N-ethylpiperidine, N-phenylpiperidine, N,N'-dimethylpiperazine, N,N'-diethylpiperazine, dimethyl formamide, diethyl formamide, dimethyl acetamide, tetramethylurea, N-methylpyrrolidone, formylmorpholine, acetylmorpholine, formylpiperidine, acetylpiperidine, N-methyl phthalimide, and quaternary ammonium salts formed from the foregoing amines, until a halogen-containing organic isocyanate is formed, and recovering from the reaction mixture said halogen-containing organic isocyanate.

2. A process according to claim 1, in which all nucleus substituents on said benzene derivative or derivatives are selected from the group consisting of halogen, methylmonohalides, methyldihalides and methyltrihalides.

3. A process according to claim 2, in which the halogen is selected from the group consisting of chlorine, bromine and fluorine.

4. A process according to claim 3, in which the halogen content of said additional substituent is at least 85 percent by weight.

5. A process according to claim 3, in which the reaction temperature is from 70° to 160°C.

6. A process according to claim 3, in which said benzyl chloride derivative or derivatives includes a compound having a single nucleus-substituted chloromethyl group which is transformed by the reaction to an isocyanatomethyl group in the halogencontaining organic isocyanate product.

7. A process according to claim 3, in which said benzyl chloride derivative or derivatives includes a compound having at least two chloromethyl groups one of which is not ortho to said additional substituent, the chloromethyl group ortho to said additional substituent being transformed by the reaction to an isocyanatomethyl group and the chloromethyl group not ortho to said additional substituent being transformed by the reaction to an isocyanatomethyl group which trimerizes to form an isocyanate ring whereby the halogen-containing organic isocyanate product comprises an isocyanate ring to the nitrogen atoms of which are attached benzyl moieties having isocyanatomethyl groups thereon.

8. A process according to claim 1 in which said amine compound is selected from the group consisting of dimethyl formamide, tetramethyl urea, N-methyl-pyrrolidone, diethylformamide, acetylpiperidine and N-formylmorpholine.

* * * * *